United States Patent
Balakrishnan et al.

(10) Patent No.: US 8,669,751 B2
(45) Date of Patent: *Mar. 11, 2014

(54) POWER SUPPLY CONTROLLER WITH INPUT VOLTAGE COMPENSATION FOR EFFICIENCY AND MAXIMUM POWER OUTPUT

(75) Inventors: Balu Balakrishnan, Saratoga, CA (US); Alex B. Djenguerian, Saratoga, CA (US); Leif Lund, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/523,570

(22) Filed: Jun. 14, 2012

(65) Prior Publication Data

US 2012/0250368 A1 Oct. 4, 2012

Related U.S. Application Data

(63) Continuation of application No. 12/363,550, filed on Jan. 30, 2009, now Pat. No. 8,222,882.

(51) Int. Cl.
*G05F 5/00* (2006.01)
*G05F 1/00* (2006.01)
*H02M 3/335* (2006.01)
*H03K 5/01* (2006.01)

(52) U.S. Cl.
USPC ......... 323/299; 323/283; 323/285; 363/21.13

(58) Field of Classification Search
USPC ............... 323/282, 283, 284, 285; 363/21.05, 363/21.09, 21.12, 21.13, 21.17
See application file for complete search history.

(56) References Cited

U.S. PATENT DOCUMENTS

| | | | |
|---|---|---|---|
| RE34,899 E | 4/1995 | Gessaman et al. | |
| 5,541,543 A | 7/1996 | Arnaud | |
| 7,298,124 B2 | 11/2007 | Kan et al. | |
| RE40,656 E | 3/2009 | Yang et al. | |
| 7,593,245 B2 | 9/2009 | Djenguerian et al. | |
| 7,639,516 B2 | 12/2009 | Usui et al. | |
| 7,652,231 B2 | 1/2010 | Kagan | |
| 7,795,851 B2 | 9/2010 | Ye et al. | |
| 7,835,162 B2 | 11/2010 | Lin et al. | |

FOREIGN PATENT DOCUMENTS

| | | |
|---|---|---|
| CN | 1780127 A | 5/2006 |
| CN | 1797926 A | 7/2006 |

OTHER PUBLICATIONS

CN 201010107596.7—First Chinese Office Action, issued Jan. 30, 2013, with English Translation (7 pages).

*Primary Examiner* — Bao Q Vu
*Assistant Examiner* — Zekre Tsehaye
(74) *Attorney, Agent, or Firm* — Blakely Sokoloff Taylor & Zafman LLP

(57) ABSTRACT

A controller for regulating an output of a power supply includes a logic block and an oscillator. The logic block generates the drive signal to control switching of a power switch in response to a clock signal. The clock signal has a frequency that decreases responsive to a time period of the drive signal, where a decrease in the time period of the drive signal represents an increase in an input voltage of the power supply. The oscillator is coupled to generate the clock signal in response to a waveform having an amplitude swing. The oscillator alters the waveform in response to the time period of the drive signal.

18 Claims, 7 Drawing Sheets

POWER SUPPLY CONTROLLER WITH INPUT VOLTAGE COMPENSATION FOR EFFICIENCY AND MAXIMUM POWER OUTPUT

This application is a continuation of U.S. patent application Ser. No. 12/363,550 filed Jan. 30, 2009. U.S. patent application Ser. No. 12/363,550 is hereby incorporated by reference.

BACKGROUND INFORMATION

1. Field of the Disclosure

The present invention relates generally to power supplies, and more specifically to switched-mode power supplies.

2. Background

Electronic devices use power to operate. Switched mode power supplies are commonly used due to their high efficiency and good output regulation to power many of today's electronics. Typically, a control circuit included in the switched mode power supply converts a low frequency (e.g. 50 or 60 Hz mains frequency), high voltage alternating current (ac) to high frequency (e.g. 30 to 300 kHz) ac. This high frequency, high voltage ac is applied to a transformer to transform the voltage, usually to a lower voltage, and to provide safety isolation. The output of the transformer is rectified to provide a regulated dc output, which may be used to power an electronic device. The switched mode power supply control circuit usually provides output regulation by sensing the output and controlling it in a closed loop. In operation, a switch is utilized to provide the desired output by regulating the duty cycle (typically the ratio of the on time of the switch to the total switching period) of the switch in a switched mode power supply.

Requirements such as efficiency, size, weight and cost are usually taken into account when designing a switched mode power supply. Greater efficiency may often be achieved by reducing the various losses which exist in a power supply for any input voltage. Typical losses experienced in a power supply are conduction losses and switching losses. Conduction losses and switching losses occur due to the electrical resistance in the circuit and the parasitic capacitance that is switched by the power supply, particularly when the switch is a transistor. When the switch conducts current, the resistance of the circuit along with the current passing in the circuit generates conduction loss. When the switch is open, voltage across the switch stores energy in the parasitic capacitance. The parasitic capacitance discharges when the switch closes, dissipating the energy stored in the parasitic capacitance in the resistance of the switch to produce switching loss. It is generally understood that a switch that is closed may conduct current and is considered on, while a switch that is open does not conduct current and is considered off. As the input voltage into the power supply increases the switching losses may increase due to increased voltages which are switched.

BRIEF DESCRIPTION OF THE DRAWINGS

Non-limiting and non-exhaustive embodiments and examples of the present invention are described with reference to the following figures, wherein like reference numerals refer to like parts throughout the various views unless otherwise specified.

Figure 1A:
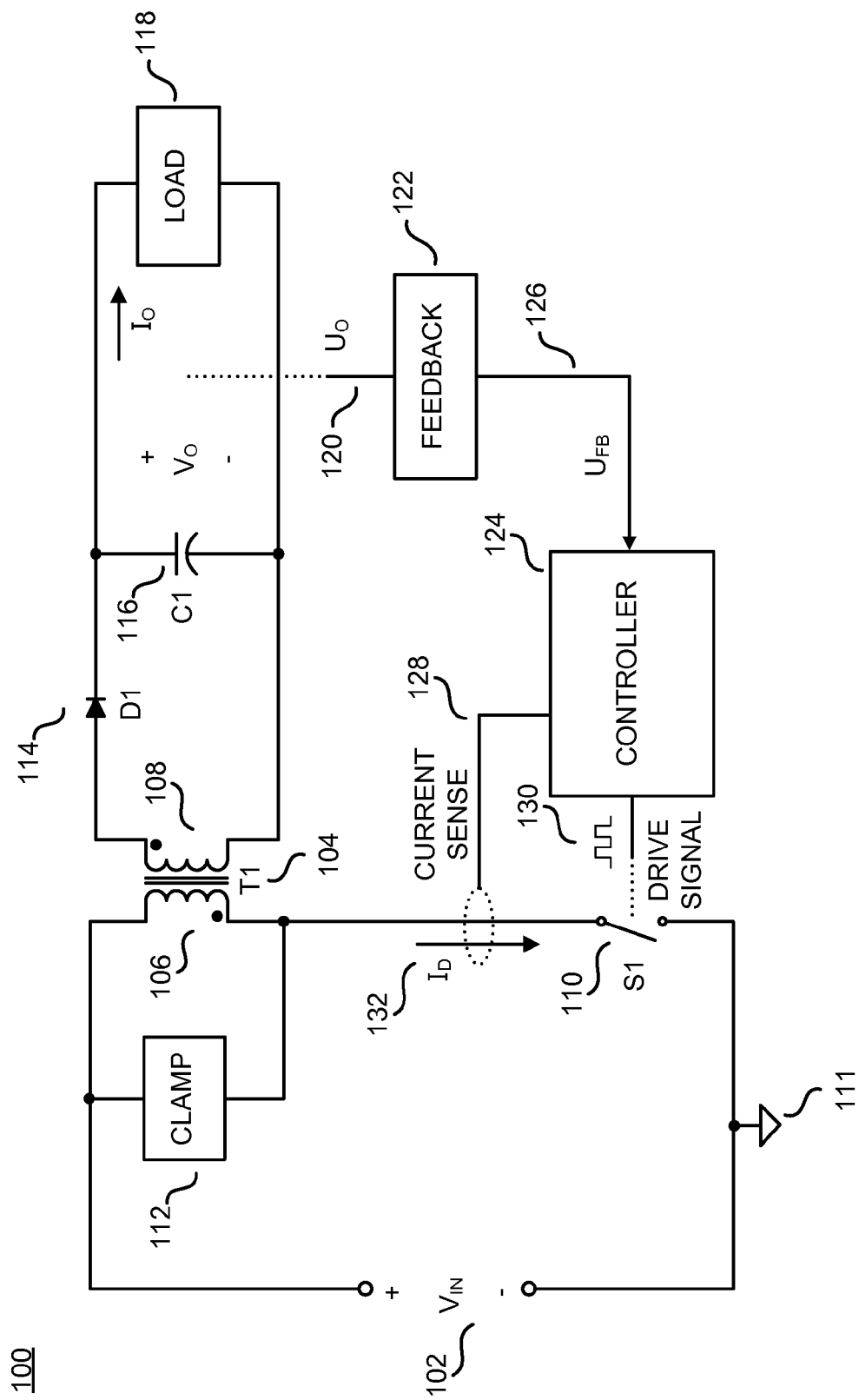
FIG. 1A is a block diagram illustrating an example switched mode power supply utilizing a controller in accordance with an embodiment of the present invention.

Elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

Efficiency considerations are often a factor in designing switched mode power supplies. As mentioned above, reducing conduction losses and switching losses leads to improved efficiency of the power supply. Conduction loss is partly due to the current passing through the various components of the circuit, including the current passing through the switch. In some examples, a metal oxide semiconductor field effect transistor (MOSFET) may be utilized for the switch. A MOSFET has three terminals a gate, source, and drain terminal. When a MOSFET is on, a resistance exists between the drain terminal and the source terminal, referred to as the on-resistance. As switch current passes through the switch, conduction losses occur due to the on-resistance of the MOSFET. On the other hand, switching loss is partly due to the voltage on the switch, the parasitic capacitance of the switch, and the switching frequency. By lowering the switching frequency, the switching loss may decrease. In general however, lowering the switching frequency of the power supply will result in an increase in switch current to deliver the equivalent energy to the output which increases conduction losses. However, depending on the configuration and requirements of the power supply, it may be beneficial to decrease switching frequency if the resulting decrease in switching loss is greater than the resulting increase in conduction loss.

In addition, switching loss is also related to the input line voltage of the power supply. In some examples, an increase in switching losses may be due to an increase in the input line voltage, an increase in the switching frequency of the power supply, or a combination of both. Depending on the device characteristics of the power supply, higher switching loss due to increased line voltage is particularly noticeable at high line (or high input voltage). In many examples, switching loss tends to be the dominant loss in comparison to conduction loss. One method to decrease the switching loss is to decrease the switching frequency of the power supply, particularly at high line voltages. However, this requires direct sensing of the input voltage which is external (and therefore a more costly solution) from the switched mode power supply control circuit. Switched mode power supplies may utilize an integrated circuit (IC) with input and output terminals for the switched mode power supply control circuit. In general, components outside of the integrated circuit are considered external to the IC and components inside the integrated circuit are considered internal to the IC. Embodiments of the present invention allow indirect sensing of the input voltage, internal to the switched mode power supply control circuit, to reduce switching frequency and decrease switching losses at high input voltage. In other embodiments of the present invention, the variation in the efficiency of the power supply in response to a change in input voltage may be reduced as the switching frequency (and/or the average switching frequency) decreases in response to an increase in the input voltage.

In addition, the maximum power (otherwise known as overload power) delivered to the output of the switched mode power supply may increase with increased input voltage. It may be desired to negate the effects of increased maximum power capability. One method to limit the maximum power would be to reduce the amount of current which is allowed to pass through the switch when there is a high input voltage. However, this generally results in an efficiency loss at high input voltages. In accordance with one embodiment of the present invention, limiting of maximum power could be achieved by reducing the switching frequency of the switch accordingly. In other embodiments, the maximum output power may decrease as the average switching frequency decreases with an increase in the input voltage. In other words, the variation in maximum output power capability due to a change in input voltage may be reduced as the average switching frequency (explained further) decreases with an increase in the input voltage. In another embodiment of the present invention, current through the switch is allowed to increase while reducing the switching frequency of the switch to produce constant power capability at high input voltages. Alternatively, embodiments of the present invention may be utilized to provide a constant output power over a variety of input voltages.

In an embodiment of the present invention, a drive signal is used to control the switching of the switch included in the power supply. A time-to-frequency converter may be included in the control circuit to indirectly sense the input voltage of the power supply by converting a time period of the drive signal (e.g., on-time, off-time, switching period, etc.) into a frequency that may, in turn, be used to generate the drive signal.

The size of components, and therefore the cost of the power supply, is typically determined by the lowest specified input voltage and the highest specified input voltage. In addition, high switch frequencies may lower the component size of the power supply. At a low input voltage, the power supply may operate at a high frequency to reduce the component size and the overall cost of the power supply to provide a desired output. As the input voltage increases, the power supply may operate at a lower frequency at the same components sizes to provide the desired output. It is beneficial to have a high switching frequency to lower component size of the power supply at lower input voltages; however, switching losses may decrease by reducing switching frequency at higher input voltages.

Referring first to FIG. 1A, a block diagram of an example switched mode power supply 100 is illustrated including input $V_{IN}$ 102, an energy transfer element T1 104, a primary winding 106 of the energy transfer element T1 104, a secondary winding 108 of the energy transfer element T1 104, a switch S1 110, a clamp circuit 112, a rectifier D1 114, an output capacitor C1 116, a load 118, an output quantity $U_O$ 120, an output voltage $V_o$, an output current $I_o$, a feedback circuit 122, a controller 124, a feedback signal $U_{FB}$ 126, a current sense input 128, a drive signal 130, and switch current $I_D$ 132. The example switched mode power supply 100 illustrated in FIG. 1A is commonly known as a flyback regulator, which is one example of a switched mode power supply topology which may benefit from the teachings of the present invention. However, it is appreciated that other known topologies and configurations of switched mode power supply regulators may also benefit from the teachings of the present invention.

The switched mode power supply 100 provides output power to the load 118 from an unregulated input $V_{IN}$ 102. In one embodiment the input $V_{IN}$ 102 is a rectified and filtered ac line voltage. The input $V_{IN}$ 102 is coupled to the energy transfer element T1 104. In some embodiments of the present invention the energy transfer element T1 104 may be a coupled inductor. In some other embodiments of the present invention the energy transfer element T1 104 may be transformer. In the example of FIG. 1A, the energy transfer element T1 104 includes two windings, a primary winding 106 and secondary winding 108. The primary winding 106 is further coupled to the active switch S1 110, which is then further coupled to the input return 111. In addition, the clamp circuit 112 is coupled across the primary winding 106 of the energy transfer element T1 104. The secondary winding 108 of the energy transfer element T1 104 is coupled to the rectifier D1 114. In the example illustrated in FIG. 1A, the rectifier D1 114 is exemplified as a diode and the secondary winding 108 is coupled to the anode end of the diode. However, in some embodiments the rectifier D1 114 may be a transistor used as a synchronous rectifier. Both the output capacitor C1 116 and the load 118 are coupled to the rectifier D1 114. In the example of FIG. 1A, the rectifier D1 114 is exemplified as a diode and both the output capacitor C1 116 and the load 118 are coupled to the cathode end of the diode. An output is provided to the load 118 and may be provided as either an output voltage $V_o$, output current $I_o$, or a combination of the two.

In addition, the switched mode power supply 100 further comprises circuitry to regulate the output which is exemplified as output quantity $U_O$ 120. In general, the output quantity $U_O$ 120 is either an output voltage $V_O$, output current $I_o$, or a combination of the two. A feedback circuit 122 is coupled to sense the output quantity $U_O$ 120 from the output of the power supply. Controller 124 is further coupled to the feedback circuit 122 and comprises several terminals. At one terminal, the controller 124 receives a feedback signal $U_{FB}$ 126 from the feedback circuit 122. The controller 124 further includes terminals such as the current sense input 128 and the drive signal terminal 130. The current sense input 128 senses the switch current $I_D$ 132 in switch S1 110. In addition, the controller 124 provides a drive signal 130 to the switch S1 110 to regulate various switching parameters. Examples of such parameters may include switching frequency, switching period, duty cycle, or respective on and off times of the switch S1 110.

In operation, the switched mode power supply 100 of FIG. 1A provides output power to the load 118 from an unregulated input $V_{IN}$ 102, such as an unregulated input voltage. The switched mode power supply 100 utilizes the energy transfer element T1 104 to transform the voltage from the input $V_{IN}$ 102 between the primary 106 and secondary 108 windings. The clamp circuit 112 is coupled to the primary winding 106 of the energy transfer element T1 104 to limit the maximum voltage on the switch S1 110. In one embodiment, the clamp circuit 112 limits the maximum reflective voltage on the switch S1 110. Switch S1 110 is opened and closed in response to the drive signal 130 received from the controller 124. In some embodiments, the switch S1 110 may be a transistor and the controller 124 may include integrated circuits and/or discrete electrical components. In operation, the switching of switch S1 110 produces a pulsating current at the rectifier D1 114. The current in rectifier D1 114 is filtered by output capacitor C1 116 to produce a substantially constant output voltage $V_O$, output current $I_O$, or a combination of the two at the load 118.

The output quantity $U_O$ 120 is sensed and regulated. In general, the output quantity $U_O$ 120 is the output voltage $V_O$, output current $I_O$, or a combination of the two. The feedback circuit 122 senses the output quantity $U_O$ 120 from the output of the power supply 100 to provide the feedback signal $U_{FB}$ 126 to the controller 124. In the example of FIG. 1A, the controller 124 receives another input from the current sense input 128 which relays the sensed current $I_D$ 132 in the switch S1 110. The switch current $I_D$ 132 may be sensed in a variety of ways, such as for example the voltage across a discrete resistor or the voltage across the transistor when the transistor is conducting.

The controller 124 outputs a drive signal 130 to operate the switch S1 110 in response to various system inputs to substantially regulate the output quantity $U_O$ 120 to the desired value. With the use of the feedback circuit 122 and the controller 124, the output of the switched mode power supply 100 is regulated in a closed loop. In addition, the controller 124 includes an oscillator which defines the switching cycle of the switch S1 110 with a switching period of $T_S$ and a switching frequency.

In one embodiment of the present invention, the frequency of the oscillator may modulate in response to the input voltage $V_{IN}$ 102. In some embodiments of the present invention, the input voltage $V_{IN}$ 102 is a rectified and filtered AC line voltage. At high input voltages, switching losses may be significantly greater than conduction losses. Improvements in efficiency may be achieved by decreasing the switching losses in the power supply 100. In accordance with one embodiment of the present invention, the frequency of the oscillator within the controller 124, and in response the switching cycle of the switch S1 110, modulates in response to the input voltage $V_{IN}$ 102. In accordance with another embodiment of the present invention, the controller controls the switch at an average switching frequency (further discussed with respect to FIG. 3B) that is substantially fixed when the input voltage $V_{IN}$ 102 is substantially fixed to regulate the output quantity $U_O$ 120 and the average switching frequency of the switch S1 110 decreases in response to an increase in the input voltage $V_{IN}$ 102. However in many cases, sensing of the input voltage $V_{IN}$ 102 is performed by discrete components external from the controller 124, such as an external resistor. Use of discrete components external from the controller 124 adds cost and may incur more losses within the power supply 100. By providing indirect sensing of the input voltage $V_{IN}$ 102, as will be further discussed with regards to FIG. 1B, the power supply may gain the benefit of lower cost along with improved efficiency. In other words, the variation in the efficiency of the power supply in response to a change in input voltage may be reduced as the switching frequency (and/or the average switching frequency) decreases with an increase in input voltage.

Figure 1B:
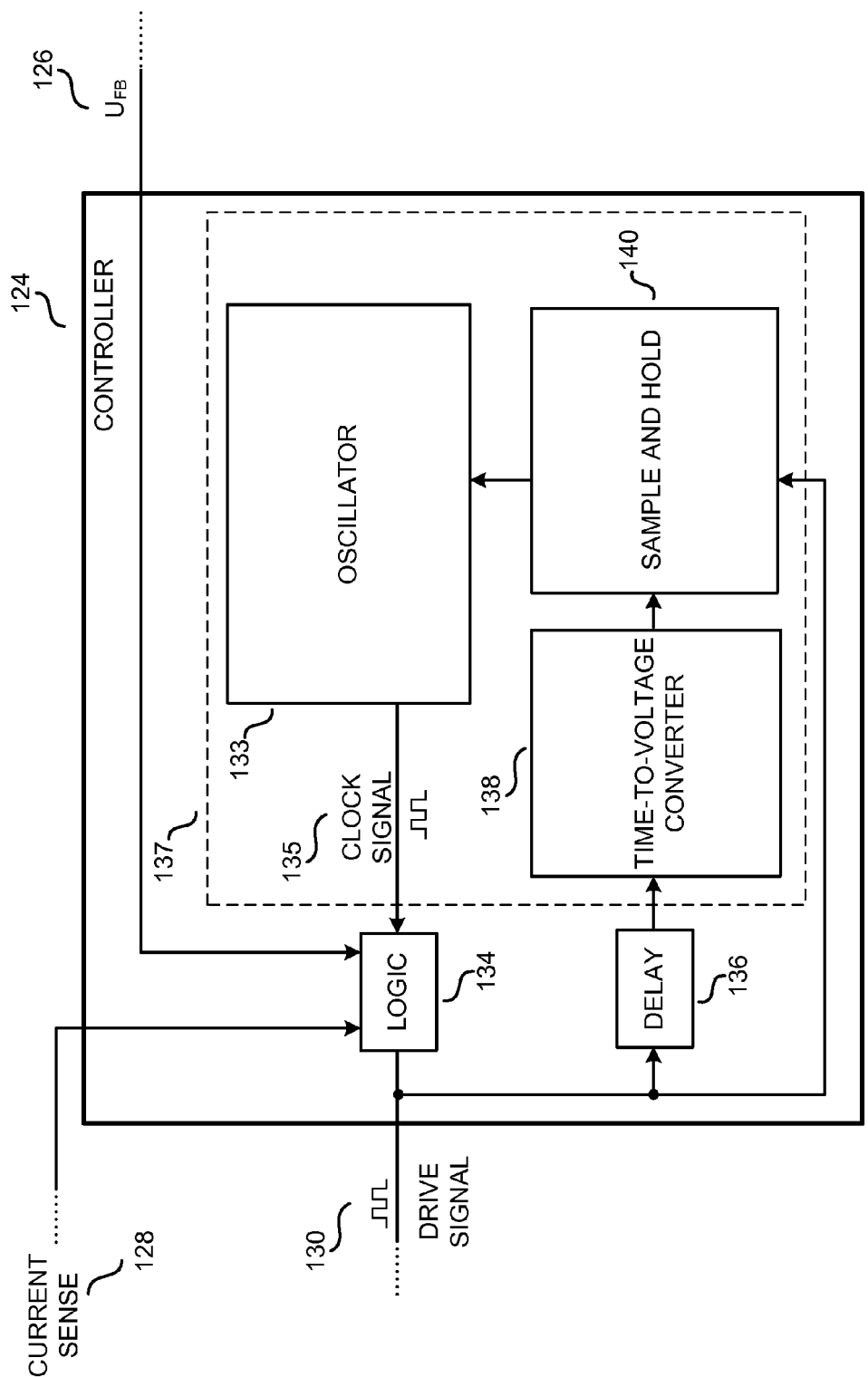
FIG. 1B is a block diagram illustrating the controller of FIG. 1A, in accordance with an embodiment of the present invention.

Referring next to FIG. 1B, a block diagram of the controller 124 of FIG. 1A is illustrated as including an input for feedback signal 126, an input for current sense signal 128, an output for drive signal 130, a logic block 134, a delay 136, and a time-to-frequency converter 137. Time-to-frequency converter 137 is illustrated as including a time-to-voltage converter 138, an oscillator 133 and a sample and hold block 140.

The controller 124, feedback signal 126, current sense 128, and drive signal 130 couple and function as described with respect to FIG. 1A. As mentioned above, the controller 124 further includes an oscillator 133 which determines the switching cycle of the switch S1 110 with a period of $T_S$. The oscillator 133 couples to the logic block 134 and outputs a signal to the logic block 134. In addition, the logic block 134 is also coupled to and receives input from the feedback signal 126, current sense signal 128, and the output of the oscillator 133. Utilizing these various signals, the logic block 134 outputs the drive signal 130 which operates the switch S1 110 and regulates various switching parameters to substantially regulate the output quantity $U_O$ 120 to the desired value.

Logic block 134 further couples to the delay 136 and the sample and hold circuit 140. In addition, both the delay circuit 136 and the sample and hold circuit receive the drive signal 130. The delay circuit 136 then couples to the time-to-voltage converter 138 and delays the time-to-voltage converter 138 from receiving the drive signal 130 by a delay time $t_D$. Time-to-voltage converter 138 and the sample and hold circuit 140 couple together while the sample and hold circuit 140 further couples to the oscillator 133.

As mentioned above, the logic block 134 utilizes the feedback signal $U_{FB}$ 126, current sense signal 128, the oscillator 133 output and various other parameters to produce the drive signal 130 which operates the switch S1 110. The drive signal 130 controls the turning on and turning off of the switch S1 110. In one example, the drive signal 130 may be a rectangular pulse waveform with varying lengths of logic high and logic low periods, with a logic high value corresponding to a closed switch and a logic low corresponding to an open switch. When the switch S1 110 is a MOSFET, the drive signal 130 may be analogous to the gate signal of a transistor with a logic high value corresponding to a closed switch and a logic low corresponding to an open switch. In one example, the length of time that the switch S1 110 is on or off may be ascertained from the drive signal. As will be discussed, the length of time which the switch S1 110 is on or off may be determined by the mode which the power supply is operating in, such as continuous conduction mode (CCM) or discontinuous conduction mode (DCM), or the type of control implemented by the controller 124, such as ON/OFF control or pulse width modulation (PWM) control. In addition, the length of time which the switch S1 110 is on is related to the value of the input 102, particularly the input voltage $V_{IN}$ 102. Depending on the mode of operation or the type of control, the relationship between switch on-time $t_{ON}$ and input voltage varies.

Figure 2:
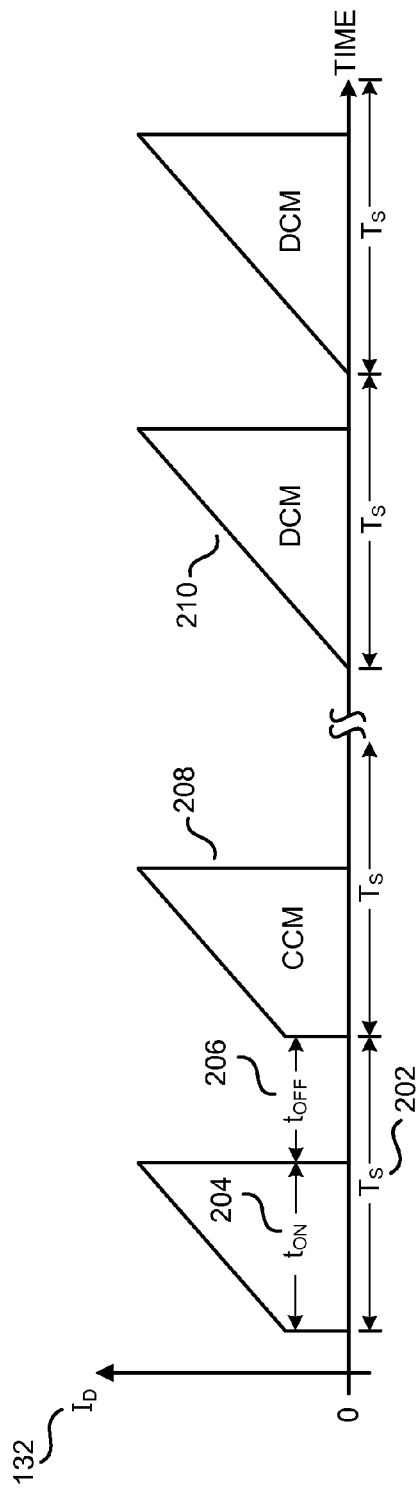
FIG. 2 is a diagram illustrating an example switching current waveform of the switched mode power supply of FIG. 1A.

The switching current of various modes of control is illustrated in FIG. 2. A diagram of an example switching current waveform of the switched mode power supply of FIG. 1A is illustrated including a switching period $T_S$ 202, a switch on-time $t_{ON}$ 204, a switch off-time $t_{OFF}$ 206, trapezoidal shape 208, and triangular shape 210. FIG. 2 illustrates the general waveforms of the switch current $I_D$ 132 over time in both continuous conduction mode (CCM) and discontinuous conduction mode (DCM).

During any switching period $T_S$ 202, switch S1 110 may conduct in response to the drive signal 130 from the controller 124 to regulate the output $U_O$. The switching period $T_S$ 202 may be separated into two sections of time: switch on-time $t_{ON}$ 204 and switch off-time $t_{OFF}$ 206. Switch on-time $t_{ON}$ 204 denotes the portion of the switching period $T_S$ 202 which the switch S1 110 is conducting. Switch off-time $t_{OFF}$ 206 denotes the remaining portion of the switching period $T_S$ 202 when the switch S1 110 is not conducting. The current waveform of FIG. 2 shows two fundamental modes of operation. The trapezoidal shape 208 is characteristic of continuous conduction mode (CCM) whereas the triangular shape 210 is characteristic of discontinuous conduction mode (DCM). During CCM, the switch current $I_D$ 132 is substantially non-zero immediately after the start of the switch on-time $t_{ON}$ 204 and steadily increases throughout the switch on-time $t_{ON}$ 204. At DCM, the switch current $I_D$ 132 is substantially zero immediately after the beginning of the switch on-time $t_{ON}$ 204 and steadily increases throughout the switch on-time $t_{ON}$ 204. During the switch off-time $t_{OFF}$ 206, the switch current $I_D$ 132 is substantially zero for both CCM and DCM.

During DCM, output power is related to the input voltage $V_{IN}$ 102 in most practical implementations. As input voltage $V_{IN}$ 102 increases, the maximum power (otherwise known as overload power) delivered to the output of the switched mode power supply 100 may increase due to the current limit delay $t_{CLD}$ 318 explained further with respect to FIG. 3B. It may be desired to negate the effects of increased maximum output power capability. As mentioned above, one method to limit maximum output power would be to reduce the amount of current which is allowed to pass through the switch when there is a high input voltage. However, this generally results in an efficiency loss at high input voltages. In accordance with one embodiment of the present invention, limiting the maximum output power at high input voltages may be achieved by reducing the switching frequency of the switch accordingly during DCM. In another embodiment of the present invention, current through the switch is allowed to increase while reducing the switching frequency of the switch to limit maximum output power at high input voltages during DCM. In addition, embodiments of the present invention may be utilized to provide a substantially constant maximum output power over a range of input voltages.

During a switching period $T_S$ 202, as the drive signal 130 is provided to the switch S1 110, the drive signal 130 is also provided to the delay circuit 136 and the sample and hold circuit 140. The delay circuit 136 delays the time-to-voltage converter 138 from receiving the drive signal 130 by a delay time $t_D$. In some embodiments, the delay time may be the minimum switch on-time $t_{ON}$ for the power supply. In one example, the minimum switch on-time $t_{ON}$ for the power supply occurs at maximum input voltage $V_{IN}$ 102. In other embodiments, the delay time $t_D$, may be smaller than the minimum switch on-time $t_{ON}$ for the power supply. In yet other embodiments, the delay time $t_D$, may be a substantially zero delay. In one example, the delay time $t_D$, may be 1.2 micro-seconds (μs). Utilizing the delay circuit 136 facilitates the design of the time-to-voltage converter 138. As will be further discussed, in some embodiments the time-to-voltage converter 138 may utilize a resistor-capacitor (RC) discharging circuit to convert the switch on-time $t_{ON}$ to a voltage, where the voltage of the time-to-voltage converter 138 is representative of the input voltage $V_{IN}$ 102. The delay circuit 136 delays the start of the RC discharging circuit by a delay time $t_D$. As mentioned above, the delay time $t_D$, may be about equal to the minimum switch on-time $t_{ON}$ which occurs at maximum input voltage $V_{IN}$ 102. The delay circuit 136 also allows the time-to-voltage converter 138 to utilize a smaller RC discharging circuit which may provide cost, size, and accuracy advantages for the controller 124. An example of an RC discharging circuit along with the resultant waveform can be seen with respect to FIGS. 4 and 5 (e.g., the time-to-voltage converter 138 of FIG. 4 and the waveform 508 at node C of FIG. 5).

As mentioned above, the duration of time that the switch S1 110 is on $t_{ON}$ 204 is related to the value of the input $V_{IN}$ 102, particularly the input voltage $V_{IN}$ 102. Since the switch on-time $t_{ON}$ may be ascertained from the drive signal 130 (as discussed with regards to FIGS. 2, 3A, and 3B), the time-to-voltage converter 138 utilizes the relationship between the on-time $t_{ON}$ of the switch S1 110 and input voltage $V_{IN}$ 102 to sense the on-time $t_{ON}$ of the switch S1 110 and convert the switch on-time $t_{ON}$ into an output, herein called the time-to-voltage converter (TVC) output. In one example, the TVC output represents the input voltage $V_{IN}$ 102 of the power supply and the TVC output is a voltage (as may be illustrated by node C of FIG. 4). The sample and hold circuit 140 then samples the value of the TVC output before the end of the switching cycle and holds the TVC output for the oscillator 133 to utilize. In some embodiments, the sample and hold circuit 140 samples the value of the TVC output at the start of the switch off-time $t_{OFF}$. Or in other words, the sample and hold circuit 140 samples the TVC output when the switch S1 110 turns off. The oscillator 133 utilizes the sampled TVC value to modulate the frequency of the oscillator 133 which then modulates the switching period $T_S$ of the power supply 100.

Figure 4:
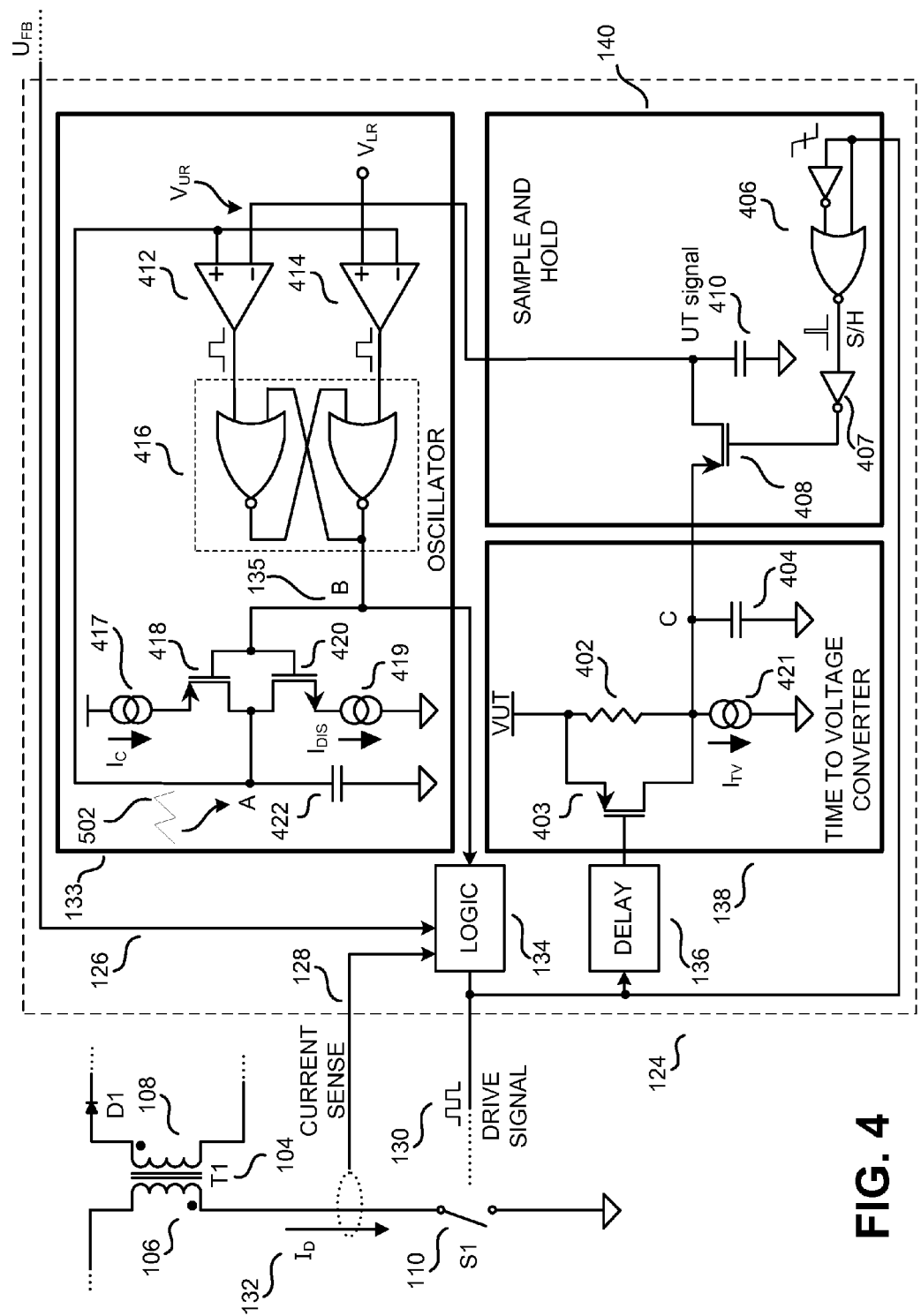
FIG. 4 is an example schematic of the controller of FIG. 1B in accordance with an embodiment of the present invention.

There are many examples for voltage controlled oscillators. In one example of an oscillator, FIG. 4 illustrates an oscillator 133 including a lower reference voltage $V_{LR}$, an upper reference voltage $V_{UR}$, comparators 412 and 414, an S-R latch 416, transistors 418 and 420, current sources 417 and 419, and capacitor 422. The current source 417 of charging current $I_C$ charges capacitor 422 to an upper reference voltage $V_{UR}$. Once the voltage of the capacitor 422 (illustrated as node A and waveform A 502) reaches the upper reference voltage $V_{UR}$, current from the capacitor 422 is discharged through current source 419 with discharge current $I_{DIS}$ until the voltage across the capacitor 422 reaches a lower reference voltage $V_{LR}$. The difference between the upper reference voltage $V_{UR}$ and the lower reference voltage $V_{LR}$ is referred herein as the amplitude swing of the oscillator 133. For the example of the oscillator 133 illustrated in FIG. 4, the size of the amplitude swing determines the frequency of the oscillator 133 (e.g., the frequency of clock signal 135). The voltage across the capacitor 422 linearly increases and decreases depending on the value of the charging current $I_C$ and the discharging current $I_{DIS}$, respectively. The larger the amplitude swing, the longer it takes for the voltage across capacitor 422 to reach the upper reference voltage $V_{UR}$ and the lower reference voltage $V_{LR}$, resulting in an increase in the period of the oscillator. Or in other words, an increase in amplitude swing of the oscillator 133 results in a decrease in the frequency of the oscillator 133. By altering the upper reference voltage $V_{UR}$, the lower reference voltage $V_{LR}$, or a combination of the two, the oscillator 133 may alter the amplitude swing and therefore alter the frequency of the oscillator 133. An example of altered frequency of the oscillator 122 due to an altered amplitude swing is illustrated with regards to FIGS. 5 and 6.

In one embodiment of the present invention, the oscillator 133 may modulate the oscillator frequency by adjusting the amplitude swing of the oscillator 133 in response to the sampled TVC output. In one embodiment of the present invention, the sampled TVC output voltage is utilized as the upper reference voltage $V_{UR}$ of the amplitude swing of the oscillator 133. In another embodiment, the sampled TVC voltage may be utilized as the lower reference voltage $V_{LR}$ of the amplitude swing of the oscillator 133. In a further embodiment, the sampled TVC voltage may be utilized as the desired amplitude swing of the oscillator 133. It is appreciated that the sampled TVC output voltage may be used in a variety of other ways to adjust the frequency of the oscillator 133.

If the amplitude swing of the oscillator 133 increases, the oscillator 133 outputs a clock signal 135 to the logic block 134 with a lower frequency and therefore a longer period. As mentioned previously, the oscillator frequency (i.e., frequency of clock signal 135) determines the switching period $T_S$ of the switch S1 110. For some embodiments, such as a power supply utilizing pulse width modulation (PWM) control, if the oscillator frequency decreases then the switching period $T_S$ increases and the switch S1 110 switches between the on and off state less often. By decreasing how often the switch S1 110 switches between the on and off state, switching losses may be reduced and a greater efficiency may be realized. For various embodiments of the present invention, at high input voltages $V_{IN}$ 102 the oscillator may lower its frequency resulting in longer switching period $T_S$ which could decrease switching losses. However, the teachings of the present invention may decrease the switching losses for any input voltage.

As illustrated in the example of FIG. 1B, the time-to-frequency converter 137 includes the oscillator 133, the time-to-voltage converter 138 and the sample and hold circuit. The time-to-frequency converter 137 receives the drive signal 130 and outputs a signal (i.e. clock signal 135) representative of the frequency of the oscillator 133 to the logic block 134. In one example, the time-to-frequency converter 137 converts the on-time $t_{ON}$ 204 of the switch S1 110 to an oscillator frequency which is utilized by the logic block 134. Utilizing the time-to-voltage converter 138, sample and hold circuit 140, and the oscillator 133, the time-to-frequency converter 137 may output a frequency corresponding to the on-time $t_{ON}$ 204 of the switch S1 110. In one example, the time-to-frequency converter 137 uses a time-to-voltage converter along with a voltage controlled oscillator to convert time to a frequency. In another example, the time-to-frequency converter 137 may use a current controlled oscillator along with a time-to-current converter to convert time to frequency. It is understood that various methods of detecting time along with various oscillators may be utilized with the present invention.

In one embodiment of the present invention, the time-to-voltage converter 138 may utilize an RC discharging circuit coupled to produce a signal of exponentially decreasing magnitude to convert the switch on-time $t_{ON}$ to a voltage, where the output voltage of the time-to-voltage converter 138 is representative of the input voltage $V_{IN}$ 102. In embodiments of the present invention, a higher input voltage $V_{IN}$ 102 generally corresponds to a shorter switch on-time $t_{ON}$. As the switch on-time $t_{ON}$ decreases the sample and hold circuit 140 will sample higher TVC output voltages corresponding to an increasing input voltage $V_{IN}$ 102. The oscillator 133 utilizes the higher sampled TVC output voltage corresponding to the increasing input voltage $V_{IN}$ 102 to adjust the amplitude swing of the oscillator 133. In one embodiment of the present invention the amplitude swing may be modified by adjusting the upper reference voltage $V_{UR}$ of the oscillator 133. This in turn will affect the frequency of the oscillator and provides the capability to adjust the frequency of the oscillator 133 in response to an indirect sensing of the input voltage $V_{IN}$ 102. By adjusting oscillator frequency, switching losses may be decreased and an improved efficiency for the power supply 100 may be achieved. Examples of possible circuit implementations and resultant waveforms of an embodiment of the present invention are illustrated with regards to FIGS. 4 and 5.

Figure 3A:
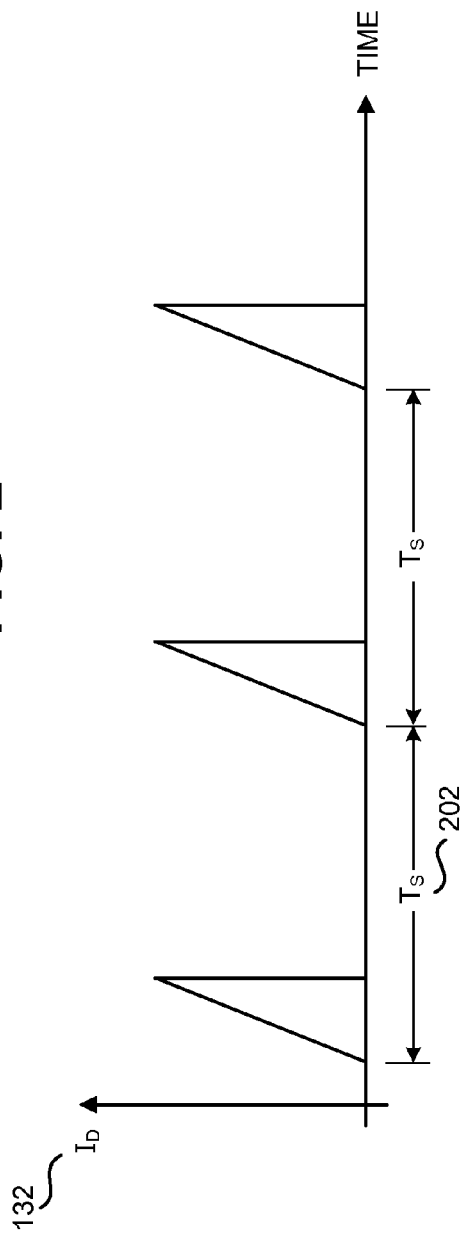
FIG. 3A is a diagram illustrating another example of a switching current waveform of the switched mode power supply of FIG. 1A utilizing pulse width modulation (PWM) control.

Referring next to FIG. 3A, another diagram of an example of a switching current waveform is illustrated. FIG. 3A demonstrates the general waveform of switch current $I_D$ 132 over time when pulse width modulation (PWM) control of the switch S1 110 is used to regulate the output quantity $U_O$.

PWM control of the switch S1 110 may be utilized with both CCM and DCM modes of operation of the power supply. As illustrated in FIG. 3A, the switch S1 110 conducts at the beginning of each switching period $T_S$ 202. For PWM control, the switching period is often the oscillator period (or the switching frequency is directly dictated by the oscillator frequency). In one example of PWM control, regulation may be accomplished by modulating the duty cycle of the switch S1 110. By changing the duty cycle, the switch on-time 204 also changes. This mode of control is known as fixed frequency voltage mode control or fixed frequency voltage mode PWM.

However, the term "fixed frequency control" does not necessarily entail that the switching frequency of switch S1 110 remains unchanged. Classically, use of the term "fixed frequency" control indicates that the switching frequency of the switch is not used as a control variable to regulate the output quantity $U_O$. With fixed frequency voltage mode control, the switch on-time $t_{ON}$ 204 or the duty cycle is utilized as a control variable to regulate the output quantity $U_O$. For the various embodiments of the present invention, modulation of the oscillator frequency, which then influences the switching period, may still be utilized alongside fixed frequency control modes since the modulation of the oscillator frequency is not utilized as a control variable to regulate the output quantity $U_O$. Instead, modulation of the oscillator frequency in response to an indirect sensing of the input voltage $V_{IN}$ 102 may decrease switching losses and improve overall efficiency of the power supply.

In fact, analysis of power supply topologies in CCM shows the voltage ratio between the output voltage $V_O$ and the input voltage $V_{IN}$ 102 is partially related to the duty cycle of the switch S1 110. For regulating the output quantity $U_O$ in power supply topologies, one controls the duty cycle of the switch S1 110. For the example of a power supply converter configured in a flyback converter configuration as shown in FIG. 1, the ratio of output voltage and input voltage in CCM is proportional to $D/(1-D)$, where the variable D represents the duty cycle. For the flyback converter in CCM, the ratio of output voltage to input voltage is not related to the switching frequency. The embodiments of the present invention may be utilized with similar systems since the oscillator frequency would not adversely affect the regulation of the output quantity $U_O$.

An example of fixed frequency control modes where the switching frequency does not remain fixed is an implementation of frequency jittering to spread the switching noise of the power supply over a wider frequency range to reduce the magnitude of some types of electromagnetic interference (EMI) emissions. With this technique, the switching frequency is modulated to reduce EMI emissions but may still be used with fixed frequency control modes since the switching frequency is not a control variable for regulation the output quantity $U_O$.

Figure 3B:
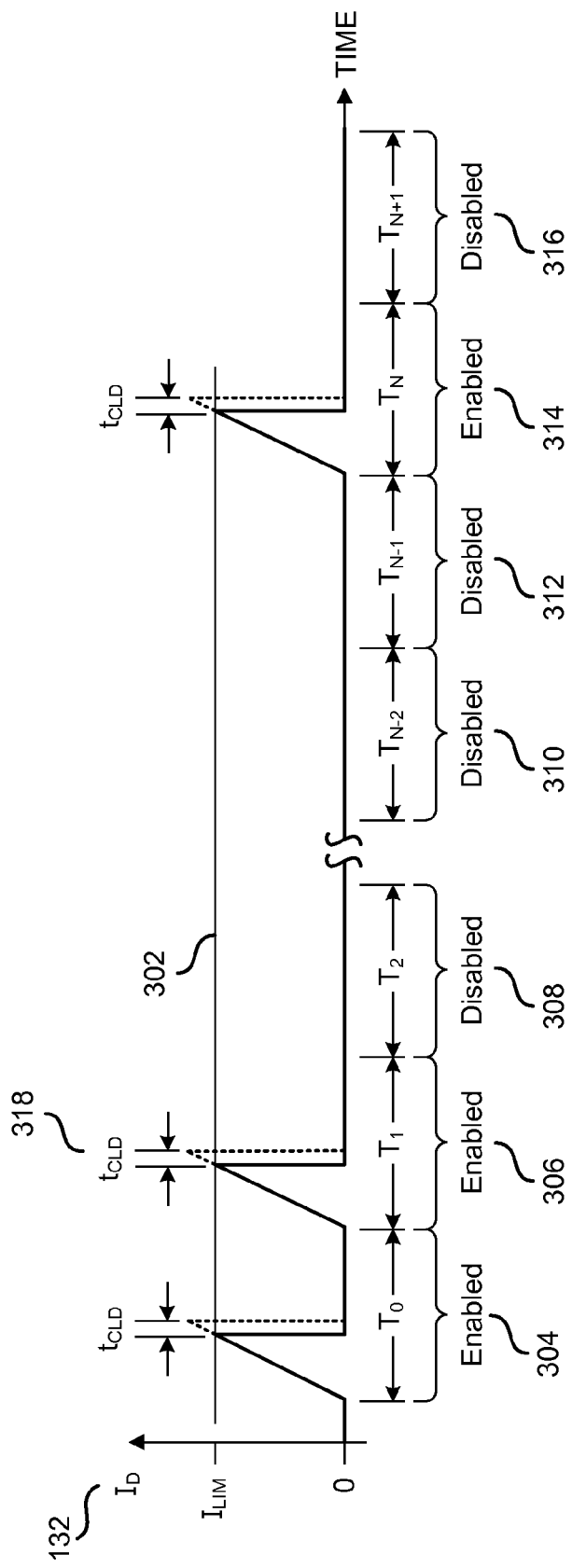
FIG. 3B is a diagram illustrating a further example of a switching current waveform of the switched mode power supply of FIG. 1A utilizing ON/OFF control.

Referring next to FIG. 3B, another diagram of an example switching current waveform is illustrated including, switch current $I_D$ 132, a current limit $I_{LIM}$ 302, switching cycles $T_O$ through $T_{N+1}$, and current limit delay $t_{CLD}$ 318. FIG. 3B demonstrates the general waveform of switch current $I_D$ 132 over time when ON/OFF control of the switch S1 110 is used to regulate the output quantity $U_O$. In general, each of the switching cycles $T_O$ through $T_{N+1}$ has a switching period of $T_S$.

In addition to PWM control, the controller 124 may also implement ON/OFF control. The switch current $I_D$ 132 waveform over time is similar to the switch current $I_D$ 132 waveform depicted in FIG. 3A, except that the switch S1 110 is not necessarily enabled at every switching cycle. The switch S1 110 conducts until the switch current $I_D$ 132 reaches a current limit $I_{LIM}$ 302. At this point the switch turns off for the remainder of the switching cycle. However, the switch S1 110 does not necessarily conduct at the beginning of every switching cycle $T_S$. At the end of every switching cycle $T_S$, the controller 124 decides whether to enable or disable the next switching cycle based on various factors about the current state of the power supply. If the controller 124 decides to enable the next switching cycle, then the switch S1 110 may conduct until the current limit $I_{LIM}$ 302 is reached. If the controller 124 does not enable the next switching cycle (in other words, disabling the next switching cycle), the switch S1 110 does not conduct for that switching cycle. In this sense, the controller 124 may regulate the output quantity $U_O$ by skipping a number of switching cycles $T_S$ 202. Devices such as LinkSwitch-TN, designed by Power Integrations of San Jose, Calif., provide further reference of ON/OFF control.

In operation, a delay time occurs after the switch current $I_D$ 132 reaches the current limit $I_{LIM}$ 302 and when the switch S1 110 turns off due to the time it takes for the circuits within the controller 124 to respond to the switch current $I_D$ 132 reaching the current limit $I_{LIM}$ 302. This delay time is herein referred to as the current limit delay $t_{CLD}$ 318. In one example, the current limit delay may be 200 nano-seconds (ns). As shown by the dotted lines, during the current limit delay $t_{CLD}$ 318 the switch current $I_D$ 132 continues to increase past the current limit $I_{LIM}$ 302 until the switch S1 110 turns off. Current limit delay $t_{CLD}$ 318 remains substantially constant over a range of input voltages $V_{IN}$ 102. As the input voltage $V_{IN}$ 102 increases, the switch current $I_D$ 132 reaches the current limit $I_{LIM}$ 302 sooner. In other words, the slope of the switch current $I_D$ 132 is steeper at higher input voltages. The switch current $I_D$ 132 increase to a higher current amount at higher input voltages than at low input voltages since the slope of the switch current $I_D$ 132 is steeper at higher input voltages and the current limit delay is substantially constant. An increase in maximum output power at higher input voltages is partially due to the effects of the current limit delay $t_{CLD}$ 318.

In some embodiments of the present invention, the current limit $I_{LIM}$ 302 may increase at high input voltages $V_{IN}$ 102. An increase in the current limit $I_{LIM}$ 302 may increase the maximum output power capability of the power supply. For example, the current limit $I_{LIM}$ 302 may increase by 14% at high input voltages $V_{IN}$ 102. In DCM, this increase could translate to approximately 30% increase in maximum output power capability. In some embodiments, reduction of the switching frequency could compensate for the increase in output power capability as the input voltage $V_{IN}$ 102 increases. In other embodiments, the maximum output power may decrease as the average switching frequency decreases with an increase in the input voltage. In other words, the variation in maximum output power capability due to a change in input voltage $V_{IN}$ 102 may be reduced as the average switching frequency (explained further) decreases with an increase in the input voltage $V_{IN}$ 102. In other embodiments, lowering the switching frequency could compensate for the increase in the maximum output power capability and provide a substantially constant output power for the power supply.

As shown in FIG. 3B, the waveform of the switch current $I_D$ 132 in the switch S1 110 is illustrated for several enabled and disabled switching cycles from $T_O$ 304 through $T_{N+1}$ 316, with a switching period $T_S$. For the example shown, the switch S1 110 conducts at the beginning of each enabled switching cycle 304, 306, and 314. Switch S1 110 conducts until the switch current $I_D$ 132 reaches the current limit $I_{LIM}$ 302. Switch S1 110 does not conduct in the disabled switching cycles 308, 310, 312, and 316. The switching frequency is determined by the frequency of the oscillator. However, over time, the effective switching frequency of the power supply is determined by a combination of the switching frequency and the overall number of enabled switching cycles. The effective frequency may also be referred to as the average switching frequency. Therefore a change to the frequency of the oscillator will produce a change in the effective switching frequency of the switch S1 110.

For the various modes of operation and control schemes, there is a relationship between the switch on-time $t_{ON}$ (or the duty cycle) and the input voltage $V_{IN}$ 102. In one example, as the input voltage increases, the switch on-time $t_{ON}$ decreases since the switch current $I_D$ 132 reaches the current limit $I_{LIM}$ 302 sooner. As shown by switch current waveform 506 in FIG. 5, the slope of the switch current $I_D$ 132 is steeper for higher input voltages. By utilizing the relationship between switch on-time $t_{ON}$ and the input voltage $V_{IN}$ 102, embodiments of the present invention utilize indirect sensing of the input voltage to modulate the frequency of the oscillator 133. Indirect sensing of the input voltage provides additional cost benefits since the sensing may be performed within the controller 124.

Referring next to FIG. 4, an example schematic of one implementation of the controller 124 of FIG. 1B is illustrated including an output for drive signal 130, feedback signal 126, current sense signal 128, oscillator 133, logic block 134, delay circuit 136, time-to-voltage converter 138, sample and hold circuit 140, resistor 402, transistor 403, capacitor 404, pulse generator 406, inverter 407, transistor 408, sample and hold capacitor 410, a lower reference (e.g., lower reference voltage $V_{LR}$), an upper reference (e.g., upper reference voltage $V_{UR}$), comparator 412, comparator 414, S-R latch 416, transistors 418 and 420, current sources 417, 419 and 421, and oscillator capacitor 422. The energy transfer element T1 104, primary winding 106, secondary winding 108, and the switch S1 110 are illustrated to provide a reference for the various components illustrated. However, in one example, controller 124 may be implemented as a monolithic integrated circuit or may be implemented with discrete electrical components or a combination of discrete and integrated circuits. In one example, controller 124 and switch 110 could form part of an integrated circuit that is manufactured as a hybrid or monolithic integrated circuit.

Figure 5:
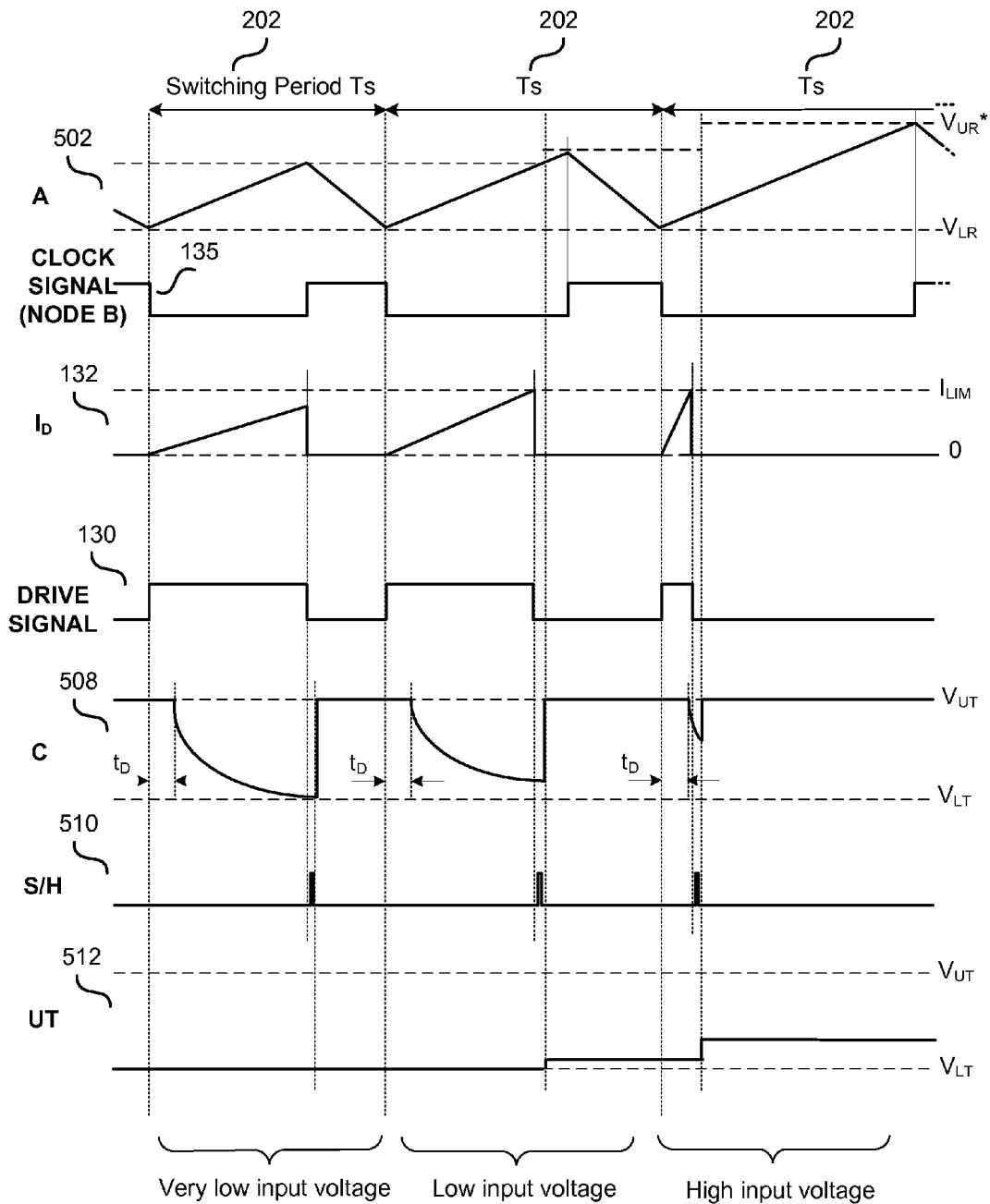
FIG. 5 is a diagram illustrating various waveforms of voltage and currents of the controller of FIG. 4 in accordance with an embodiment of the present invention.

In addition, FIG. 4 includes node annotations such as A, B, C, S/H, and UT. The waveforms at these respective nodes over various input voltages are illustrated in FIG. 5. For example, nodes A, B, and C correspond to the waveforms 502, 135, and 508, respectively of FIG. 5. The waveform at node A 502 illustrates the voltage waveform of the oscillator 133. The waveform at node B illustrates the clock signal 135 output of the oscillator while the waveform at node C 508 illustrates the output of the time-to-voltage converter 138. FIG. 5 also includes the switch current waveform $I_D$ 132, drive signal waveform 130, the sample and hold waveform S/H 510, and the upper reference signal UT 512. The waveforms in FIG. 5 illustrate a power supply in DCM with ON/OFF control. However, it should be appreciated that power supplies operating in various modes and types of control may also utilize the embodiments of the present invention. As mentioned above, the oscillator 133, time-to-voltage converter 138, and the sample and hold circuit 140 couple together as a time-to-frequency converter 137 to convert a time period to a frequency.

In one example, the controller 124 includes the oscillator 133, logic block 134, delay 136, time-to-voltage converter 138, and sample and hold circuit 140 which are coupled and function as mentioned above. As mentioned above, the logic block 134 receives various signals, such as the feedback signal 126, current sense signal 128 and the oscillator 133 output to generate a drive signal 130 which controls the switching of switch S1 110 to regulate an output quantity $U_O$ 120 to the desired value. The drive signal 130 is also sent to the delay circuit 136 to delay the signal by a delay time of $t_D$. In one embodiment, the delay circuit 136 may delay the drive signal 130 to the time-to-voltage converter by a delay time $t_D$ substantially equal to shortest switch on-time $t_{ON}$ of the power supply. An example of the drive signal 130 is illustrated in FIG. 5. In one embodiment, the drive signal 130 is a rectangular pulsed waveform switching between a logic high and a logic low value. As shown in FIG. 5, when the drive signal 130 is high, the switch S1 110 conducts. When the drive signal 130 is low, the switch S1 110 does not conduct. By examining the switch current waveform 132 of FIG. 5, when the drive signal 130 is a logic high, the switch current increases in the switch current waveform 132. When the drive signal 130 is a logic low, the switch S1 110 turns off and the switch current waveform $I_D$ 132 drops substantially to zero, creating the triangular shape of the switch current waveform $I_D$ 132. As illustrated in the switch current waveform 132, the switch on-time $t_{ON}$ varies between very low input voltage to high input voltage. The higher the input voltage, the sooner the switch current reaches the current limit. As a result, the switch on-time is shorter for higher input voltages. Using this relationship, the frequency of the oscillator may adjust depending on the value of the input voltage.

In one example, the delayed drive signal 130 is sent to the time-to-voltage converter 138. As illustrated, the time-to-voltage converter 138 includes an upper threshold voltage $V_{UT}$, resistor 402, transistor 403, capacitor 404, and a current source 421 with a time-to-voltage current $I_{TV}$. The upper threshold voltage $V_{UT}$ is coupled to both the resistor 402 and the source terminal of the transistor 403, when the transistor 403 is a p-channel MOSFET. The resistor 402 and the drain terminal of the transistor 403 are then coupled to the capacitor 404 and the current source 421 with a time-to-voltage current $I_{TV}$ to produce an exponentially decreasing voltage waveform at node C (further illustrated in FIG. 5 as time-to-voltage output waveform 508). It should be appreciated that the time-to-voltage converter 138 illustrated may be utilized with power supplies with an inverse relationship between switch on-time and input voltage. The drive signal 130 is received at the gate terminal of the transistor 403. As illustrated in FIG. 4, the drive signal waveform 130, and the time-to-voltage output waveform C 508 of FIG. 5, when the delayed drive signal 130 is low, the transistor 403 is conducting and the capacitor 404 is charged to the upper threshold voltage $V_{UT}$. Once the delayed drive signal 130 is high, the transistor 403 is not conducting and the charge stored in the capacitor 404 discharges through the current source 421 at a rate defined by the values of the resistor 402, current source 421 and the capacitor 404.

In some embodiments of the present invention, the oscillator 133 modulates its frequency by changing the amplitude swing of the upper reference voltage $V_{UR}$ and the lower reference voltage $V_{LR}$. In the example shown in FIG. 4, the oscillator 133 may modulate its frequency by keeping the lower reference voltage $V_{LR}$ constant and changing the upper reference voltage $V_{UR}$ between an upper and lower threshold in response to an indirect sensing of the input voltage $V_{IN}$ 102.

For an example of the time-to-voltage converter 138, the upper threshold voltage $V_{UT}$ may be the maximum voltage value of the upper reference voltage $V_{UR}$ of the oscillator 133. For convenience, the upper reference voltage $V_{UR}$ of the oscillator 133 may change between a lower threshold voltage $V_{LT}$ and an upper threshold voltage $V_{UT}$ as illustrated in FIG. 5. The amplitude swing of the oscillator 133 is the difference between the upper reference voltage $V_{UR}$ and the lower reference voltage $V_{LR}$. As such, in some embodiments of the present invention, the voltage stored within the capacitor 404 of the time-to-voltage 138 converter changes between the upper threshold voltage $V_{UT}$ and the lower threshold voltage $V_{LT}$ as illustrated in FIG. 5 in waveform 508. In other words, the output of the time-to-voltage converter 138 may be a voltage between the lower threshold voltage $V_{LT}$ and the upper threshold voltage $V_{UT}$. In one embodiment, the longer the switch on-time then the longer the drive signal 130 is at a logic high. The longer the drive signal 130 is high, then the longer the discharge time for the capacitor 404 and the lower the voltage of the capacitor 404 at the end of the switching period $T_S$. Therefore, in one embodiment of the present invention, the time-to-voltage converter 138 may convert the switch on-time $t_{ON}$ to a voltage value. The output voltage of the time-to-voltage converter 138 is then utilized by the oscillator 133 as the upper reference voltage $V_{UR}$ and the voltage output of the time-to-voltage converter 138 may vary from a lower threshold voltage $V_{LT}$ to an upper threshold voltage $V_{UT}$ over many switching cycles.

The output of the time-to-voltage converter 138 is sampled by the sample and hold circuit 140. The sample and hold circuit 140 includes the pulse generator 406, an inverter 407, transistor 408 and the sample and hold capacitor 410. In one embodiment, the pulse generator 406 further includes a NOR gate and an inverter. Drive signal 130 is sent to the sample and hold circuit 140 and is received at the pulse generator 406. Using the drive signal 130, the pulse generator 406 generates a pulse at the falling edge (in other words, the transition from logic high to logic low) of the drive signal 130. The drive signal 130 is received at the input of the pulse generator 406, which includes the NOR gate and an inverter coupled to one input of the NOR gate. The drive signal 130 is further received at the input of the NOR gate not coupled to the inverter and the input of the inverter of the pulse generator 406. For a NOR gate to output a logic high, both inputs should be a logic low value. However, due to the properties of the inverter, a delay is present at the pulse generator and the NOR gate outputs a logic high at the falling edge of the drive signal 130 for a pulse of time. In some examples, the pulse is 120 nano-seconds (ns) wide. The output of the pulse generator 406 is then coupled to the inverter 407. The inverter 407 inverts the output of the pulse generator 406 and couples to the gate terminal of transistor 408, when the transistor 408 is a p-channel MOSFET. When the output of the pulse generator 406 is high the output of the inverter 407 is low, causing the transistor 408 to conduct and the charge is redistributed between the capacitor 404 and the capacitor 410. Capacitor 410 then samples and holds some of the voltage of capacitor 404 at the falling edge of the drive signal 130. The amount of time for the charge to redistribute between capacitors 404 and 410 may be influenced by the size differences of these capacitors, the size of the transistor 408, and the duration of the pulse generated by the pulse generator 406. Generally, the smaller in size of capacitor 410 with respect to capacitor 404, the quicker the charge redistribution. However, in operation it may take several switching cycles of switching period $T_S$ for the charge to redistribute evenly between capacitors 404 and 410. In some embodiments of the present invention, the sample and hold circuit transfers a small amount of charge from capacitor 404 to capacitor 410 in each switching cycle and many switching cycles may be needed to redistribute the charge between capacitor 404 and capacitor 410 to build the voltage across capacitor 410 to the TVC output voltage. By waiting several switching cycles to fully charge the capacitor 410 and in response changing the frequency of the oscillator 133, the change in oscillator frequency does not interfere with the stability of the power supply. The falling edge of the drive signal 130 corresponds to the end of the switch on-time $t_{ON}$ and the output of the time-to-voltage converter 138 is held at capacitor 410 for the oscillator 133. Utilizing the time-to-voltage converter 138 and the sample and hold circuit 140, the oscillator frequency may be modulated in response to the input voltage of the power supply.

The output of the pulse generator 406 may be illustrated as the sample and hold waveform S/H 510 depicted in FIG. 5. A pulse is generated at the S/H waveform 510 at the falling edge of the drive signal 130. The upper reference signal UT 512 illustrates the value of the capacitor 410. As illustrated in FIG. 5 with regards to waveforms C 508, S/H 510 and UT 512, the shorter the switch on-time $t_{ON}$ (corresponding to a higher input voltage of the power supply) the sooner the time-to-voltage output waveform C 508 is sampled and the higher the voltage value is stored in the capacitor 410.

Figure 6:
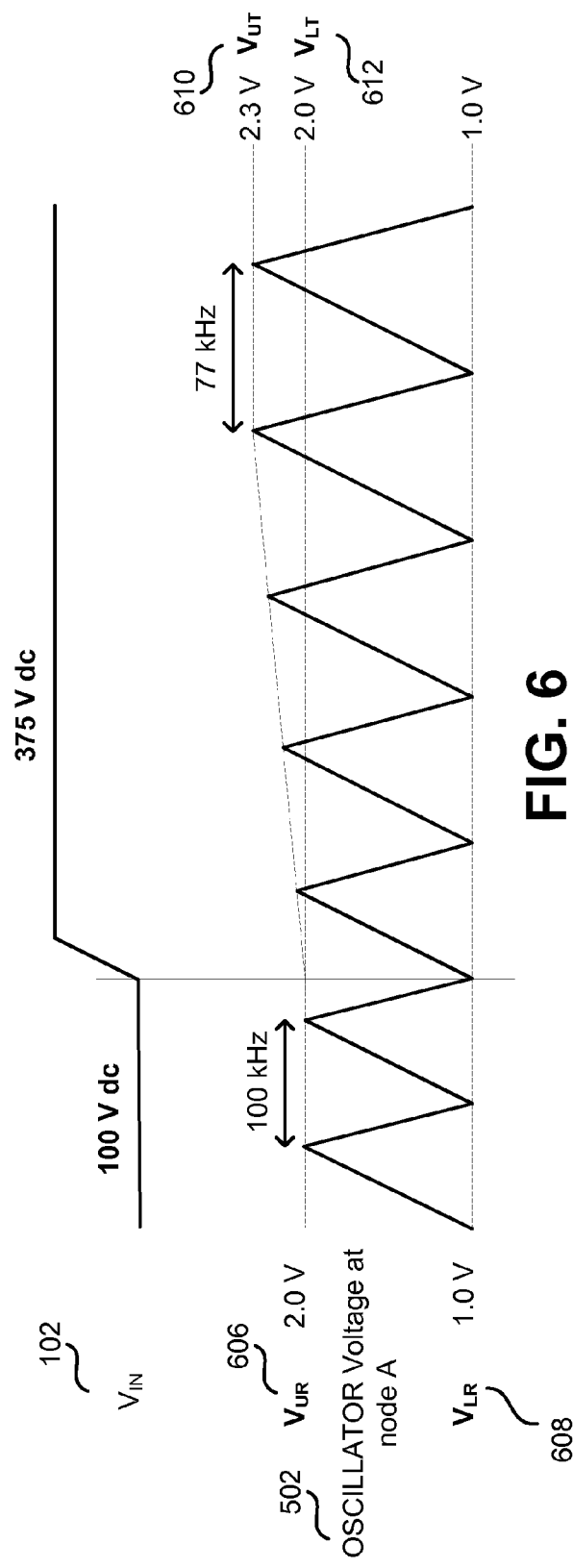
FIG. 6 is a diagram illustrating an example of oscillator voltage of the controller of FIG. 4 in accordance with an embodiment of the present invention.

The oscillator 133 includes a lower reference voltage $V_{LR}$, upper reference (e.g., upper reference voltage $V_{UR}$), comparators 412 and 414, S-R latch 416, transistors 418 and 420, current source 417 with charging current $I_C$, current source 419 with discharging current $I_{DIS}$, and oscillator capacitor 422. The voltage from capacitor 410, which represents the output value of the time-to-voltage converter 138, is received at the negative input terminal of comparator 412. The negative terminal of comparator 412 is also referred to as the upper reference voltage $V_{UR}$ of the oscillator 133. On the other hand, the positive terminal of the comparator 414 couples to and receives the lower reference voltage $V_{LR}$ of the oscillator 133. Both the positive terminal of comparator 412 and the negative terminal of comparator 414 are coupled to node A, the waveform of node A 502 is illustrated in FIG. 5. Outputs of comparators 412 and 414 input into the S-R latch 416. In one embodiment of the present invention, the S-R latch 416 is implemented with NOR gates. The output of the S-R latch, illustrated as node B, is then outputted to the logic block 134 as the output (i.e., clock signal 135) of the oscillator 133. As illustrated in FIG. 5, the oscillator output, (i.e. clock signal 135) is a rectangular pulse waveform. The period of clock signal 135 is the same as the period of the triangular waveform exhibited by waveform A 502. The oscillator 133 modulates its frequency by altering the amplitude swing of waveform A 502 as illustrated in FIG. 5 (and subsequently waveform 502 of FIG. 6). The larger the amplitude swing of the oscillator 133, as illustrated in FIGS. 5 and 6, the longer the period of the oscillator and the slower the frequency.

The output of the S-R latch 416 is coupled to a triangular waveform generator including transistors 418 and 420, a current source 417 with charging current $I_C$, current source 419 with discharging current $I_{DIS}$ and a capacitor 422. In one embodiment of the present invention, transistor 418 may be a p-channel MOSFET while transistor 420 may be a n-channel MOSFET. When the output of the S-R latch is a logic low value, transistor 418 conducts while transistor 420 does not conduct. As such, the capacitor 422 charges and the voltage at node A ramps up at a slope determined by the value of the charging current $I_C$ of current source 417 and the size of capacitor 422. When the voltage at node A reaches the upper reference voltage $V_{UR}$, a logic high value is outputted from the S-R latch 416. Once node B is at a logic high value, transistor 418 does not conduct and transistor 420 beings to conduct. The charge stored in capacitor 422 is discharged through current source 419 and the slope of the discharged voltage is determined by the value of the discharging current $I_{DIS}$ and the size of capacitor 422. Once the voltage at node A reaches the lower reference voltage $V_{LR}$, the output of the S-R latch 416 switches to a low logic value and the voltage at node A begins to increase. The relationship between node A and node B is illustrated in waveforms 502 and clock signal 135 of FIG. 5. By altering the amplitude swing of the oscillator 133, the frequency of the oscillator 133 may be modulated. If the upper reference voltage $V_{UR}$ is increased, the frequency of the oscillator would decrease since it would take a longer period of time for the triangular waveform at node A to reach the upper reference voltage $V_{UR}$. In one example, the slope of waveform 502 of FIGS. 5 and 6 remains substantially the same as the upper reference voltage $V_{UR}$ changes. That is, the slope of waveform 502 when upper reference voltage $V_{UR}$ is at the upper threshold voltage $V_{UT}$ is the same as the slope when upper reference voltage $V_{UR}$ is at the lower threshold voltage $V_{LT}$.

Referring next to FIG. 5, various waveforms corresponding to FIG. 4 are illustrated. FIG. 5 illustrates the waveform differences between high input voltages to very low input voltages $V_{IN}$ 102. At high input voltages, the time-to-voltage output waveform 508 is sampled much sooner since the switch on-time $t_{ON}$ is shorter (illustrated by the drive signal 130, switch current waveform 506 and the sample and hold waveform S/H 510) than at the low input voltage illustrated. As a result, a higher voltage is stored at capacitor 410 over time, illustrated by upper reference waveform UT 512, and utilized as the upper reference voltage $V_{UR}$ to modulate the frequency of the oscillator 133.

As mentioned above, FIG. 6 illustrates the oscillator voltage waveform 502 at node A of FIG. 4. In accordance with one embodiment of the present invention, the waveform at node A is generally a triangular waveform which ramps between a lower reference voltage $V_{LR}$ and an upper reference voltage $V_{UR}$. However, in accordance with some embodiments of the present invention, the oscillator may modulate its frequency by altering the upper reference voltage $V_{UR}$. The upper reference voltage $V_{UR}$ may be between a lower threshold voltage $V_{LT}$ 612 and an upper threshold voltage $V_{UT}$ 610.

However, in other embodiments of the present invention, the oscillator frequency may be modulated due to an altering of the lower reference voltage $V_{LR}$, or due to a combination of altering both the lower reference voltage $V_{LR}$ and the upper reference voltage $V_{UR}$.

The input voltage waveform $V_{IN}$ 102 may increase to a higher voltage, in this example illustrated as an increase from 100 V dc to 375 V dc. Utilizing various embodiments of the present invention, the voltage waveform 502 of the oscillator (or in other words the voltage waveform at node A 502) may oscillate between a lower reference voltage $V_{LR}$ 608 and an upper reference voltage $V_{UR}$ 606. As illustrated, when the input voltage $V_{IN}$ 102 increases, the frequency of the voltage waveform 502 of the oscillator decreases since the upper reference voltage $V_{UR}$ 606 increases. In this example, when the input line voltage is 100 V dc, the oscillator frequency is at 100 kilo-Hertz (kHz). When the input line voltage increases to 375 V dc, the oscillator frequency decreases to 77 kHz. As shown in FIG. 6, the upper reference voltage 606 may be altered from 2.0 V (lower threshold voltage $V_{LT}$ 612) and 2.3 V (upper threshold voltage $V_{UT}$ 610) and the lower reference voltage 608 is shown as 1.0 V.

As mentioned above, the current limit $I_{LIM}$ 302 may increase at high input voltages $V_{IN}$ 102. An increase in the current limit $I_{LIM}$ 302 may increase the maximum output power of the power supply. For example, the current limit $I_{LIM}$ 302 may increase by 14% at high input voltages $V_{IN}$ 102. In DCM, this increase could translate to approximately 30% increase in maximum output power. In some embodiments, reduction of the switching frequency from 100 kHz to 77 kHz could compensate for the 30% increase in maximum output power. In other embodiments, lowering the switching frequency from 100 kHz to 77 kHz could compensate for the 30% increase in output power and provide a substantially constant output power for the power supply The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A power supply, comprising:
   an energy transfer element coupled to transfer energy between an input and an output of the power supply;
   a power switch coupled to the energy transfer element; and
   a controller coupled to provide a drive signal to control switching of the power switch, wherein the controller includes:
   a logic block coupled to generate the drive signal to regulate an output of the power supply in response to a clock signal having a frequency that decreases responsive to a time period of the drive signal, wherein a decrease in the time period of the drive signal is representative of an increase in an input voltage of the power supply; and
   an oscillator coupled to generate the clock signal in response to a waveform having an amplitude swing, wherein the oscillator alters the amplitude swing of the waveform responsive to the time period of the drive signal; wherein the amplitude swing is a difference between an upper reference and a lower reference of the oscillator, and wherein the oscillator alters the waveform by adjusting at least one of the references responsive to the time period of the drive signal.

2. The power supply of claim 1, wherein the oscillator adjusts the at least one reference between a lower threshold and an upper threshold.

3. The power supply of claim 2, wherein a slope of the waveform generated by the oscillator when the at least one reference is at the lower threshold is substantially equal to a slope of the waveform when the at least one reference is at the upper threshold.

4. The power supply of claim 2, wherein the frequency of the clock signal is a first frequency when the at least one reference is at the lower threshold and wherein the frequency of the clock signal is a second frequency when the at least one reference is at the upper threshold.

5. The power supply of claim 4, wherein the first frequency is greater than the second frequency.

6. The power supply of claim 1, wherein the logic block is coupled to generate the drive signal having a switching frequency responsive to the frequency of the clock signal.

7. The power supply of claim 1, wherein the logic block is adapted to increase the switching frequency of the drive signal responsive to an increase in the frequency of the clock signal.

8. The power supply of claim 1, wherein the controller is an integrated circuit controller and wherein the power switch is included in the integrated circuit controller.

9. The power supply of claim 1, wherein the frequency of the clock signal is responsive to the amplitude swing.

10. A controller for regulating an output of a power supply, the controller comprising:
    a logic block coupled to generate the drive signal to control switching of a power switch in response to a clock signal having a frequency that decreases responsive to a time period of the drive signal, wherein a decrease in the time period of the drive signal is representative of an increase in an input voltage of the power supply; and
    an oscillator coupled to generate the clock signal in response to a waveform having an amplitude swing, wherein the oscillator alters the amplitude swing of the waveform responsive to the time period of the drive signal;
    wherein the amplitude swing is a difference between an upper reference and a lower reference of the oscillator, and wherein the oscillator alters the waveform by adjusting at least one of the references responsive to the time period of the drive signal.

11. The controller of claim 10, wherein the oscillator adjusts the at least one reference between a lower threshold and an upper threshold.

12. The controller of claim 11, wherein a slope of the waveform generated by the oscillator when the at least one reference is at the lower threshold is substantially equal to a slope of the waveform when the at least one reference is at the upper threshold.

13. The controller of claim 11, wherein the frequency of the clock signal is a first frequency when the at least one reference is at the lower threshold and wherein the frequency of the clock signal is a second frequency when the at least one reference is at the upper threshold.

14. The controller of claim 13, wherein the first frequency is greater than the second frequency.

15. The controller of claim 14, wherein the logic block is coupled to generate the drive signal having a switching frequency responsive to the frequency of the clock signal.

16. The controller of claim 15, wherein the logic block is adapted to increase the switching frequency of the drive signal responsive to an increase in the frequency of the clock signal.

17. The controller of claim 10, wherein the controller is an integrated circuit controller and wherein the power switch is included in the integrated circuit controller.

18. The controller of claim 10, wherein the frequency of the clock signal is responsive to the amplitude swing.

* * * * *